Figure 1:
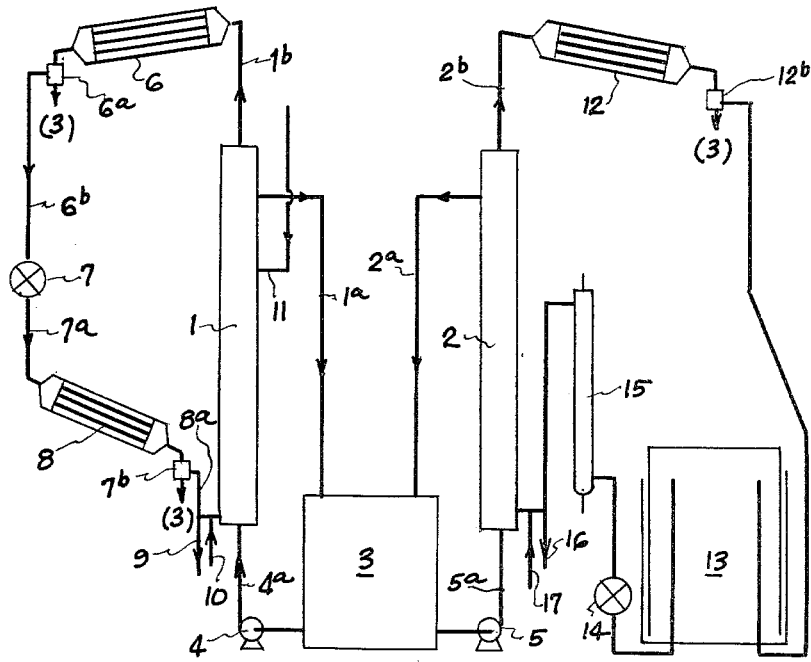

July 27, 1965

P. CHASSAING ETAL  3,197,515
PROCESS FOR PREPARING DICHLORETHYLENE AND MIXTURES
THEREOF WITH VINYLIDENE CHLORIDE

Filed Sept. 27, 1962

2 Sheets-Sheet 1

Pierre Chassaing
Georges Clerc
INVENTORS

BY Doms, McDougall & Hersh
Att'ys

INVENTORS
Pierre Chassing
Georges Clerc
by McDougall, Hersh & Scott
Attys

United States Patent Office
3,197,515
Patented July 27, 1965

3,197,515
PROCESS FOR PREPARING DICHLORETHYLENE AND MIXTURES THEREOF WITH VINYLIDENE CHLORIDE
Pierre Chassaing and Georges Clerc, Saint Auban, France, assignors to Pechiney-Compagnie de Produits Chimiques et Electrometallurgiques, Paris, France
Filed Sept. 27, 1962, Ser. No. 229,257
Claims priority, application France, Sept. 29, 1961, 874,556
4 Claims. (Cl. 260—654)

This invention relates to the preparation of trans dichlorethylene and mixtures of dichlorethylene and vinylidene chloride and it relates more particularly to the equipment employed in the preparation of such unsaturated halogenated hydrocarbons.

In 1929 Nieuwland and Foohey disclosed that acetylene reacts with a mixture of cuprous and cupric chlorides in aqueous hydrochloric acid solution and then with potassium or ammonium chlorides to form, depending upon the reaction conditions, substantially pure trans dichlorethylene or mixtures of dichlorethylene with other unsaturated chlorinated hydrocarbons with the concurrent reduction of cupric chloride to the cuprous state.

Other investigators have thereafter described operating conditions intended to reduce the described process to commercial practice. The equipment suggested usually included two reaction columns in the form of towers arranged in series. The acidic solution of copper chlorides at 90–95° C. was continuously circulated through the equipment. Acetylene was injected at the bottom of the first column and the chlorinated products were collected at the top. The liquid exhausted from the reaction and deficient in cupric salts was circulated from the first column to the second column where it was regenerated with chlorine and with a mixture of air and hydrogen chloride. The process described is fraught with a number of difficulties.

The acetylene introduced at the bottom portion of the reaction column does not react completely and the complex formed by the reaction of acetylene with acidic cupric chloride is not completely converted to dichlorethylene by the time that the solution arrives at the top of the column. As a result, some dichlorethylene is evolved in the regeneration column where its admixture with air or oxygen exposes the process to violent explosion.

In the attempt to obviate this difficulty, it has been proposed to introduce in series between the outlet from the first tower and the inlet to the second tower, an intermediate reactor in which the liquid is raised to boiling for degassification to remove the dichlorethylene before introduction into the second column for regeneration. This precaution so markedly increases the cost of operation as to render the described process commercially unacceptable.

It is an object of this invention to provide a new and improved process and equipment for the preparation of trans-dichloroethylene and mixtures thereof with vinylidene chloride and it is a related object to provide a method and means of the type described which is safe and efficient, which produces the desired end product in high yield and in a relatively pure or easily purifiable state, which makes use of minimum equipment and materials, and which is free of the objectionable features of processes that have heretofore been employed.

These and other objects and advantages of this invention will hereinafter appear and for purposes of illustration, but not of limitation, an embodiment of the invention is shown in the accompanying drawing, in which—

Figure 2:
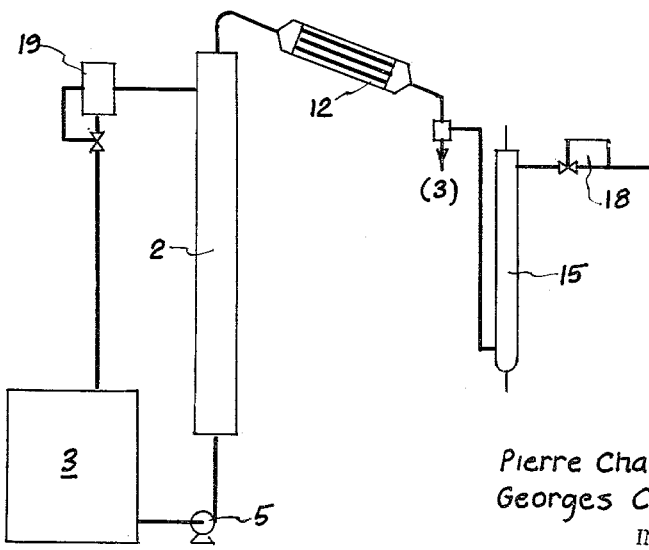
Figure 3:
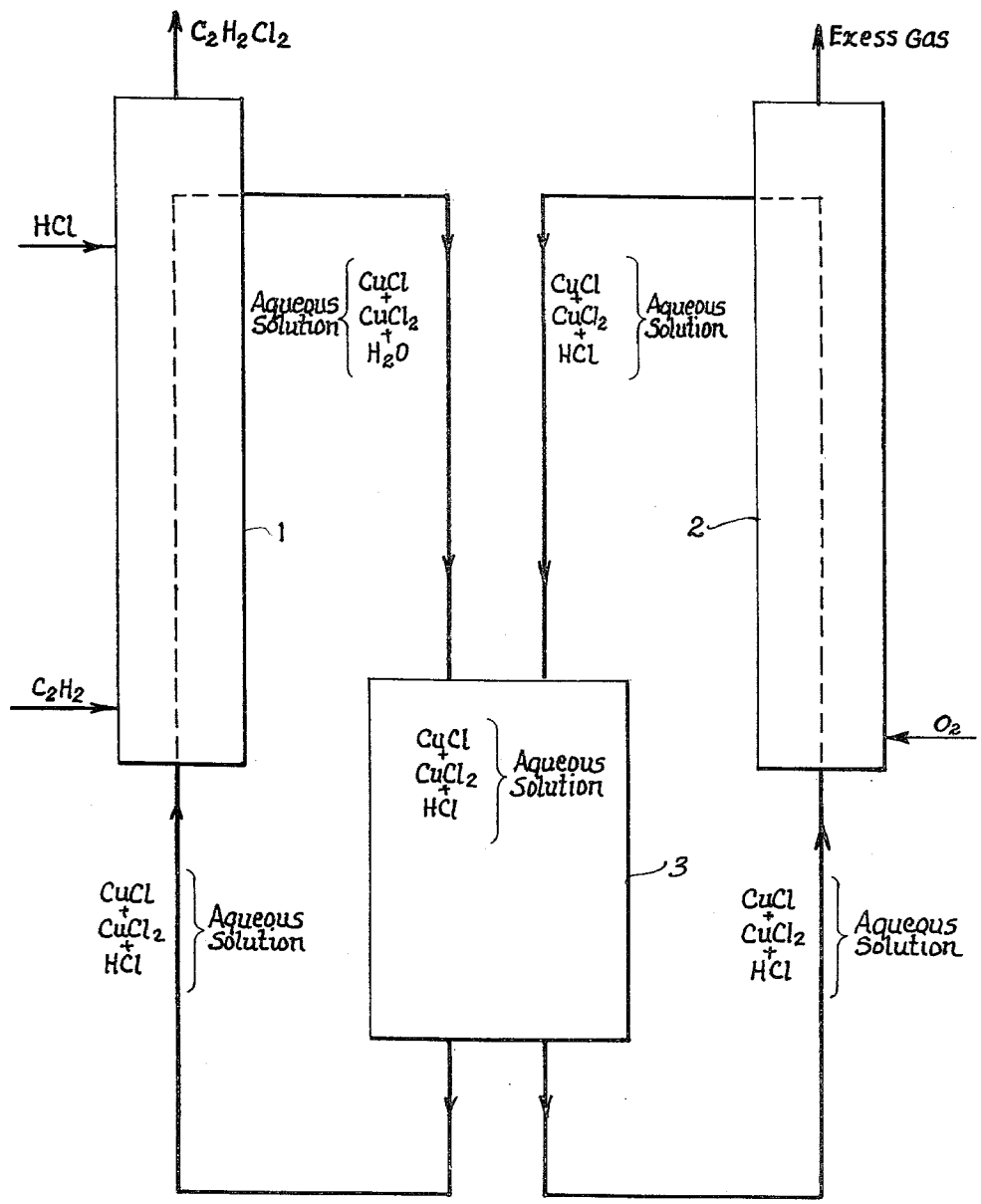

FIG. 1 is a schematic arrangement of the equipment employed in the practice of this invention, FIG. 2 is a schematic arrangement similar to that of FIG. 1 showing a modification of the equipment of FIG. 1, and FIG. 3 is a flow diagram of the process of this invention.

In accordance with the practice of this invention, trans-dichlorethylene and mixtures thereof with vinylidene chloride are prepared by reaction of acetylene with an aqueous solution of cuprous and cupric chlorides in hydrochloric acid and the mixture of dichlorethylene and vinylidene chloride is formed by thereafter reacting the product with ammonium or potassium chloride, and in which the solution from the first reaction is regenerated by oxidation to rebuild the cupric oxide concentration with both reactions being carried out in parallel whereby the effluent from the first reaction constitutes the feed to the second re-oxidation reaction while the effluent from the latter is employed as a feed for the first reaction.

With reference now to the arrangement of the equipment employed in the practice of this invention and the flow of materials therethrough, the numerals 1 and 2 refer to the reaction columns in the form of towers connected in parallel with an intermediate tank 3 in between. The overflow in line 1ª from the top of the column 1 and the overflow in line 2ª from the top of the tower 2 both lead into the tank 3 and the mixture of solutions in tank 3 is recirculated by pump 4 through line 4ª to the inlet at the bottom of the column 1 and by pump 5 through line 5ª to the inlet at the bottom of the column 2. The rate of flow of feed into and through each of the columns can thus be independently regulated.

Acetylene is introduced through line 10 into the inlet at the bottom of the tower 1. In the tower which is 7 to 13 meters high the acetylene pressure at the inlet is maintained at a level most favorable for solution in the liquid without danger of explosions. For this purpose, a pressure of about 1.5 to 2.5 kilos absolute per square centimeter can be used.

It has been found that the concentration of copper salts in solution materially affects the rate of conversion of the acetylene in proportion to the concentration of the copper salts. In other words, the rate of conversion increases with the higher concentrations of the copper salts in solution. As a result, it is desirable to maintain the concentration of the copper salts as close to saturation in the solution as possible. For this purpose, it is desirable to circulate the solution of the copper salts at high speed through the column 1 thereby to minimize the increase in the concentration of cuprous salt by reduction of the cupric salt per unit volume of solution. In practice, reaction speed is at a maximum at about 90° C. However, it is desirable to maintain a higher temperature at the head of the column for the purpose of avoiding excessive entrainment of dichlorethylene and acetylene in the solution that is returned through line 1ª to the tank 3. The additional heat required to maintain the temperature at the desired level can be achieved in accordance with the practice of this invention by the introduction of the hydrogen chloride into the reaction column 1 at about the upper third thereof, as through line 11. Solution of the hydrogen chloride gas is effected with the generation of heat sufficient to build up the temperature levels to enhance the evolution of acetylene and dichlorethylene from the solution. While introduction of hydrogen chloride in the manner described is not essential, it does operate to increase the efficiency of the process and it operates greatly to reduce the danger of explosions in the regeneration reaction.

The gaseous components including chlorinated hydrocarbons, excess acetylene and water vapor are separated from the liquid exhausted from the top of the column 1 at about 80–105° C. The liquid is advanced through line 1a to the intermediate tank 3. The gaseous components, preferably at atmospheric pressure, are advanced through line 1b to a heat exchanger 6 through which refrigerant is circulated to condense most of the water vapor and the chlorinated hydrocarbons which are collected in separator 6a. The remaining vapors, passing through line 6b, are introduced into a compressor 7 and compressed to about 1.7 to 2.5 absolute atmospheres pressure. The compressed gases are advanced through line 7a to a second heat exchanger 8 through which refrigerant is circulated to reduce the compressed gases to a temperature of about 0° C. for condensation of the remainder of the water vapor and chlorinated hydrocarbons. The condensed water is removed through the separator 7b and returned through line 9 to the intermediate tank 3 while the separated water vapor and hydrocarbons are stored. The uncondensed acetylene is returned through line 8a to the bottom of column 1 for use as feed with additional acetylene added through line 10 in amounts to make up for the quantity which has been consumed in the reaction.

The intermediate tank 3 comprises a closed container preferably having a capacity which is about ten times the volume of the reaction column 1. It receives the hydrogen chloride solution of copper salts which is exhausted as a liquid from the top of column 1 and the condensed water which has been separated from the vapors issuing from each of the columns 1 and 2. The solution is allowed to stand in the tank for a time sufficient to enable the unconverted complex from column 1 to decompose to form low boiling chlorinated ethylenic hydrocarbons which will distill off upon formation.

The tank contains a sufficient quantity of solution to minimize such variation in concentration of the liquid as might otherwise occur over short periods of time. This provides for a blending of materials and thus provides for a more uniform and controlled operation of the process.

The regeneration column 2 is provided with an inlet at the bottom for the introduction of solution from tank 3. Oxygen is introduced into the bottom of column 2 through the same inlet or from a separate inlet in communication with line 17. The oxygen can be introduced as pure oxygen or diluted with an inert gas such as nitrogen or air. The oxygen is introduced at a rate corresponding to about one-half of the rate of acetylene absorbed in column 1. In general, no acid is introduced at the base of column 2 since the required amount of hydrogen chloride is introduced preferably in the upper portion of the reaction column 1. However, if a deficiency does exist, additional hydrogen chloride can be introduced at the base of column 2.

Since the temperature of the solution is substantially fixed, the rate of oxygen in column 2 will depend greatly on the partial pressure of oxygen and the concentration of the cuprous chloride in the solution. Thus the speed of the reaction can be controlled by the concentration of partial pressure of oxygen in the gases introduced at the base of column 2. The oxygen or oxygen containing gases can be introduced into the column under a few atmospheres pressure and the exhaust of gases can be regulated with the aid of a suitable reducing valve for issuance from the head of the column 2 at about atmospheric pressure. The column is also provided with a level regulator 19 for control of liquid level in the column.

In the preferred practice of this invention, the gases exhausted from the head of the column 2 are recirculated with the addition of oxygen to make up for the amount which has been consumed in the regeneration reaction. A portion of the residual gases is preferably bled off in an amount to avoid build-up of the concentration of acetylene in the gaseous feed to an amount greater than 1 percent.

The amount of oxygen absorbed in column 2 can be regulated by control of the partial pressures of oxygen in the feed. The amount of oxygen absorbed can also be regulated by the rate of flow of liquid through the column 2. With a slower rate of flow, the concentration gradient of the cuprous chloride becomes more important with such lower concentrations leading to a lowering of the speed of the reaction. This gives some indication of the independency of the flow rates of the cupric solution in the two columns.

The gases issuing from the head of column 2 are advanced through line 2b to a heat exchanger 12 through which refrigerant is circulated for condensation of water vapor which is recirculated to the intermediate tank 3. The gases leaving the heat exchanger are sent to a washer 15 where they are scrubbed with a heavy organic solvent such as hexachlorobutadiene and trichlorobenzenes (particularly mixtures of the 1,2,3 and 1,2,4 trichloro-isomers) for recovery of dichlorethylene usually contained in small amounts in the gases. The dichlorethylene is recovered from the scrubbing liquid by distillation or other conventional topping processes. The portion of the equipment contacted with copper salts in solution in hot hydrochloric acid is lined either with glass or with graphite and the described equipment is also carefully covered with thermal insulation. The columns are preferably in the form of packed towers embodying bubble caps, raschig rings, silica balls or the like for enhancing gas-liquid contact.

While the reactions taking place are highly exothermic, passage of the gases in excess in the aqueous solution, at a temperature of 80–105° C., will cause vaporization of water in a manner to compensate for the heat evolved such that the temperature will remain at a relatively uniform value which will depend, in part, on the rate of flow of the gases in excess thereby to provide an internal means for the control of the reaction independent of exterior heating means.

Contrary to the present beliefs, applicants have found that the molecular ratio of cuprous to cupric chloride is not critical for most efficient operation. It is desirable, however, to maintain the concentration of the salts as close to saturation of the solution as possible under the conditions existing, which depend upon the temperature of the solution and the content of hydrogen chloride and later the content of ammonium or potassium chloride. For the preparation of pure dichlorethylene which does not require the presence of alkali chloride, it is desirable to make use of a solution in which the ratio of cuprous to cupric chloride is less than 1.

For the preparation of relatively pure trans-dichlorethylene it is desirable to make use of an aqueous solution in which the cuprous chloride is present in an amount within the range of 0.5 to 2.0 moles per liter, in which the cupric chloride is present in an amount within the range of 1 to 3 moles per liter, and in which the hydrogen chloride is present in an amount within the range of 3.5 to 5.5 moles per liter.

For the simultaneous preparation of dichlorethylene and vinylidene chloride, it is desirable to make use of an aqueous solution containing 3 to 5 moles per liter of cuprous chloride, 0.5 to 1.5 moles per liter cupric chloride, 0.5 to 1.5 moles per liter of hydrogen chloride, and 3 to 4 moles per liter of ammonium or potassium chloride.

In both processes, the liquid is maintained at a temperature within the range of 70–105° C. and preferably within the range of 85–95° C.

The following are given by way of examples of the practice of this invention:

*Example 1*

Use is made of the equipment illustrated in FIG. 1 in which the reaction column 1 and the regeneration column 2 are of the same size, having a diameter of 220 mm. and an effective length of about 9 meters. This gives a useful capacity in each column of 342 liters. The columns are fed with liquid from tank 3 by the pumps 4 and 5. The tank 3 has a capacity of 1,800 liters of solution and permits a total volume of about 1,500 liters of solution to be used in the process.

The acetylene is introduced at the bottom of the reaction column 1 while the hydrogen chloride is introduced through line 11 to the upper third of the column. The gases issuing from the head of column 1 are advanced through line 1b to the heat exchanger 6. Dichlorethylene and water condensed in the heat exchanger 6 are separated in the drain 6a and returned to the tank 3. The remaining gases are compressed by the compressor 7 and the compressed gases are passed into the heat exchanger 8. The condensed dichlorethylene and any water is separated from the gases issuing from the exchanger 8. Before the remaining gases issuing from the exchanger 8 are recycled to the bottom of the reaction column 1, a certain proportion is bled off through line 9 in order to maintain a uniform concentration of inert products. Fresh acetylene is introduced through line 10 for introduction with the recycled gases in column 1.

In the regeneration column 2, the oxygen is introduced in admixture with nitrogen in the lower end of column 2. The gases issuing from the outlet at the head of the column are passed through line 2b to the heat exchanger 12 through which a refrigerant is returned. The water condensed from the exhaust gases by the separator 12b are returned to the tank 3. The remaining gases are stored in a reservoir 13 having a capacity of about 15 m.³. From the reservoir 13, the gases are compressed by a pump 14 prior to being advanced to an extraction column 15 where the gases are washed with a heavy solvent in which dichlorethylene is retained by absorption or solvency. The clean gases exhausted from the top of the washer are recirculated to the bottom of the extraction column 2. A small amount of the exhaust gases is bled off through line 16 prior to the addition of oxygen through line 17 for passage into the column.

The composition of the cupric-cuprous solution fed into the column is maintained in the following concentrations, expressed in moles per liter:

CuCl ------------------------------------------- 1.7
CuCl$_2$ ---------------------------------------- 2.8
HCl -------------------------------------------- 4.5

When the operation is stabilized, the acetylene is absorbed at a rate of 12.3 normal m.³/hour (540 moles per hour) with total consumption including the amount of acetylene drained from the system through line 9. The gas is introduced at the bottom of the reaction column at a rate of 26 normal m.³/hour. The pressure at the bottom of this column is maintained at about 2.05 absolute kilos per square centimeters. The temperature of the gases recycled from the outlet of the exchanger 8 is at about 3° C. In the exchangers 6 and 8, 47.1 kg. of dichlorethylene per hour (486 moles per hour) is condensed.

18.4 m.³/hour of gas containing 63.6 percent of oxygen are introduced into the bottom of the regeneration column 2. The gases exhaused from column 2, after water of condensation has been removed at 12, contain about 41.9 percent of oxygen. The concentration of dichlorethylene in the regeneration gas exhausted from the condenser 12 is 5.96 percent and the concentration of dichlorethylene in the gas re-introduced into the column 2 is 2.2 percent. In the washer 15, about 1.4 kg./hour of dichlorethylene is recovered.

In practice, a small stream of nitrogen is bubbled through the storage tank 3 for the further removal of dichlorethylene to recover about 4 kg./hour. Per 549 moles per hour of absorbed acetylene, 486 moles per hour of condensed dichlorethylene are recovered, including 14.3 moles per hour of dichlorethylene from the regeneration gases and 41.6 moles per hour of dichlorethylene from tank 3. On the whole, the yield, based upon the amount of acetylene absorbed, is 98.6 percent.

Other than the dissolved acetylene, the following is the composition of the product in mole percent:

Dichlorethylene ---------------------------- 93.84
Vinylidene chloride ------------------------ 3.84
Trichlorethylene --------------------------- 2.20
Vinyl chloride ----------------------------- 0.12

From the point of view of the energy required, the equipment operates practically with thermal autonomy. The losses of heat from the insulated equipment are compensated about equally by the excess of heat balance in the process. At the inlet of the reaction column 1, the temperature is about 95° C. It drops to 92° C. by the time that liquid reaches the point of introduction of hydrogen chloride. Upon introduction of hydrogen chloride, the temperature rises to approximately 95° C. The rate of flow of the solution through the reaction column 1 corresponds to about 4,600 liters per hour. This will give an increase of approximately 0.24 mole per liter in the concentration of cuprous ion between the inlet and the outlet of the column.

The rate of flow in the regeneration column 2 can vary from 1,325 liters to 5,500 liters per hour. This corresponds with the gradient in concentration of cuprous ion going from 0.83 to 0.20 mole per liter. Thus an accurate regulation of the quantity of oxidized cuprous ion is achieved to balance the quantity of cuprous ion formed in the reaction column. The temperature at the inlet to the regeneration column is 95° C. and the temperature gradient varies with the flow rate of the solution. With a flow rate of 5,500 liters per hour, the temperature at the outlet is about 97° C.

The productive capacity of the reaction column is about 154 kg. of dichlorethylene per hour per cubic meter of contact volume.

Example 2

In this example, use is made of equipment shown in FIG. 2 in which only the regeneration side is different than the equipment shown in FIG. 1. Instead of making use of a feed of oxygen and nitrogen, the oxygen containing gas introduced at the bottom of column 2 constitutes air such that the exhaust from the scrubber 15 can be allowed to escape into the atmosphere. The exhaust from the regeneration column 2 is cooled in the heat exchanger 12. The condensed water can be either recycled to the tank 3 or eliminated. The gases from the heat exchanger 12 are passed into the column 15 for washing with heavy solvent before being expanded through the expansion valve 18 for release into the atmosphere. The solvent used as the scrubbing liquid is recycled to the scrubber 15 after treatment and recovery of the dichlorethylene contained therein. Operation under pressure requires the use of a regulator 19 for controlling the level of the catalytic solution at the outlet of the regeneration column 2 before its return to the tank 3.

In the action to produce a mixture of trans-dichlorethylene and vinylidene chloride, a solution is employed having the following concentration, expressed in moles per liter:

CuCl ------------------------------------------- 4
CuCl$_2$ ---------------------------------------- 1
HCl -------------------------------------------- 1
NH$_4$Cl ----------------------------------------- 4

14 normal m.³/hour acetylene (668 moles per hour) are absorbed, not counting the acetylene drained through line 9. The flow rate of the gas recycled at the bottom of the reaction column 1 is 31.5 m.³/hour. The temperature of the gases before recycling is about 4° C. About 55.8 kg. of dichlorethylene per hour (575 moles per hour) are condensed in the exchangers 6 and 8.

At the bottom of the regeneration column 2, 60 normal m.³/hour of air is introduced under an absolute pressure of 5.15 kg./cm.². At the outlet, the pressure is 4.05 absolute kilos/cm.² and, after condensation of the water in condenser 12, the gas contains only 11.55 percent of oxygen. The concentration of dichlorethylene in the gases exhausted through line 12ª may amount to as much as 0.875 percent. The washing installation operating under pressure permits recovery of 20.7 moles per hour (2 kg. per hour) of dichlorethylene. Contrary to the working conditions described in Example 1, the gas expanded from the scrubber 15 is freed of dichlorethylene and then exhausted into the atmosphere.

From the nitrogen which is passed through the solution tank 3, 5.85 kg. of dichlorethylene per hour (60.3 moles per hour) are recovered.

Thus for 668 moles of acetylene consumed per hour, recovery is made of 575 moles of condensed dichlorethylene, 20.7 moles from the regeneration gases and 60.3 moles from the stale gas in solution tank 3. On the whole, a recovery rate or yield based upon acetylene reaches 98.3 percent.

The product obtained has the following composition, expressed in mole percent:

| | |
|---|---|
| Trans dichlorethylene | 73.0 |
| Vinylidene chloride | 26.30 |
| Vinyl chloride | 0.65 |
| Trichlorethylene | 0.05 |

At the inlet of the two columns, the temperature is 95° C. In the reaction column 1, through which the solution circulates at a flow rate of 5,000 l./h., the temperature drops to approximately 91° C. immediately in advance of the point of introduction of the hydrogen chloride and then it rises to approximately 95° C. at the outlet of the column. The flow rate of the solution in the regeneration column 2 varies between 1,800 and 6,000 l./h. and the temperature at the outlet of the column will vary between 97° and 100° C.

The productive capacity of the reaction column is about 188 kg. of dichlorethylene per hour per cubic meter.

It will be understood that changes may be made in the details of construction, arrangement and operation of the equipment without departing from the spirit of the invention, especially as defined in the following claims.

We claim:

1. In the process of preparing dichlorethylene and mixtures thereof with vinylidene chloride comprising a first acetylene reaction of acetylene with an aqueous hydrochloric acid solution of cuprous chloride and cupric chloride in which cupric chloride is converted to cuprous chloride to provide a liquid effluent richer in cuprous chloride than is the feed and in which dichlorethylene is removed overhead, and a second oxidation reaction in which a hydrochloric acid solution of cupric chloride and cuprous chloride is reacted with oxygen containing gas to reconvert cuprous chloride to cupric chloride and provide an effluent richer in cupric chloride than is the feed, the improvement comprising feeding said effluent from the acetylene reaction to a receiver, feeding said effluent from the oxidation reaction to the same receiver for mixture with said effluent from the acetylene reaction, feeding to the acetylene reaction from the receiver the mixture made up of said effluent from the acetylene reaction and said effluent from the oxidation reaction and feeding to the oxidation reaction from the same receiver the mixture of the said effluents from the oxidation reaction and the acetylene reaction, thereby operating the oxidation and acetylene reactions in parallel with a common feed therebetween.

2. The process as claimed in claim 1 in which the solution of cuprous and cupric chloride in the acetylene reaction is substantially saturated in such cuprous and cupric chloride salts.

3. The process as claimed in claim 1 in which the hydrogen chloride is introduced into the final third of the reaction zone.

4. The process as claimed in claim 1 in which the oxygen for regeneration of the liquid in the oxidation reaction is achieved by the introduction of oxygen diluted with an inert gas.

References Cited by the Examiner

UNITED STATES PATENTS

| | | | |
|---|---|---|---|
| 2,392,957 | 1/46 | Thomas | 208—163 X |
| 2,440,997 | 5/48 | Adler | 260—654 |
| 2,858,347 | 10/58 | Hutchings | 260—654 X |
| 2,915,565 | 12/59 | Jacobowsky et al. | 260—654 |
| 3,079,444 | 2/63 | Jacobowsky et al. | 260—654 |

FOREIGN PATENTS 615,106   2/61   Canada.

LEON ZITVER, *Primary Examiner.*